US011385329B2

United States Patent
Fauth

(10) Patent No.: US 11,385,329 B2
(45) Date of Patent: *Jul. 12, 2022

(54) RADAR SENSOR AND ROBOT USING THE SAME

(71) Applicant: ABB Schweiz AG, Baden (CH)

(72) Inventor: Mathias Fauth, Zug (CH)

(73) Assignee: ABB Schweiz AG, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/342,566

(22) Filed: Jun. 9, 2021

(65) Prior Publication Data

US 2021/0293925 A1    Sep. 23, 2021

Related U.S. Application Data

(63) Continuation of application No. PCT/EP2018/084153, filed on Dec. 10, 2018.

(51) Int. Cl.
*G01S 7/40* (2006.01)
*G01S 13/34* (2006.01)
*G01S 13/88* (2006.01)

(52) U.S. Cl.
CPC .......... *G01S 7/4078* (2021.05); *G01S 7/4056* (2013.01); *G01S 13/34* (2013.01); *G01S 13/881* (2013.01)

(58) Field of Classification Search
CPC .................... G01S 7/4078; G01S 7/4056
See application file for complete search history.

(56) References Cited

U.S. PATENT DOCUMENTS

| 2011/0174998 | A1* | 7/2011 | Molnar | G01S 3/782 250/550 |
| 2015/0009062 | A1 | 1/2015 | Herthan | |
| 2015/0029054 | A1 | 1/2015 | Kech | |

FOREIGN PATENT DOCUMENTS

| DE | 10028864 A1 * | 12/2001 | G01S 7/4004 |
| DE | 10028864 A1 | 12/2001 | |
| DE | 102013010993 A1 | 1/2015 | |
| EP | 2199763 A1 * | 6/2010 | G01F 23/284 |
| EP | 2199763 A1 | 6/2010 | |
| EP | 2829852 A2 | 1/2015 | |

* cited by examiner

*Primary Examiner* — Erin F Heard
*Assistant Examiner* — Helena H Seraydaryan
(74) *Attorney, Agent, or Firm* — Leydig, Voit & Mayer, Ltd.

(57) ABSTRACT

A radar sensor includes: a transceiver unit for emitting a radar beam at at least two different wavelengths along a beam path in an outgoing direction and to receive radar radiation along the beam path in an incoming direction; and a reference object placed in the beam path for redirecting part of the outgoing radar beam in the incoming direction. The reference object includes two identical grids, each grid having regularly spaced elements arranged at a distance d from each other in a first direction perpendicular to the beam path, the grids being spaced from one another along the beam path by a distance L. The transceiver unit is operable at a wavelength λ which satisfies $$L = n\frac{2d}{\lambda^2}$$

n being an integer.

19 Claims, 2 Drawing Sheets

RADAR SENSOR AND ROBOT USING THE SAME

CROSS-REFERENCE TO PRIOR APPLICATION

This application is a continuation of International Patent Application No. PCT/EP2018/084153, filed on Dec. 10, 2018, the entire disclosure of which is hereby incorporated by reference herein.

FIELD

The present invention relates to a radar sensor and to a robot in which the radar sensor is used.

BACKGROUND

Radar sensors are widely used in automotive technology for detecting persons and objects in the vicinity of a vehicle. For instance, DE 10 2013 010993 A1 describes a radar system which is mounted to the rear of a vehicle body and which triggers an automatic opening of the vehicle boot if it detects the user approaching.

In robotics, it is a general practice to install sensors in the vicinity of a robot that are capable to detect the presence of a person, in order to stop a movement of the robot if the person is close enough to be injured if hit by the robot.

In the case of DE 10 2013 010993 A1, if the radar sensor isn't operating properly and fails to detect the approach of a person, the vehicle boot remains closed and has to be opened by hand. In a robot system, on the other hand, if the approach of a person goes undetected, the robot may be moving to the same place as the person, and if both collide, there is a serious risk of injury. Therefore, in robotic applications, it is necessary to detect a possible failure of the radar sensor, so that operation of the robot may be enabled only if it has been established unequivocally that the radar sensor is operating correctly and is capable of detecting the approach of a person.

A conventional way to do so, shown e.g. in EP 2 199 763 B1 and EP 2 829 852 A2, is by detecting a radar echo from a reference element which is placed outside the leakage zone of the radar sensor, in a region where the radar beam from a transceiver of the sensor is expected to propagate.

A drawback of this approach results from the fact that the distance between the transceiver and the reference object must be smaller than the distance in which the person must be detected, since otherwise detection of the reference object might be thwarted by the presence of a person between the radar sensor and the reference object, but the smaller the distance is, the stronger is the radar echo of the reference object. When the reference object is immobile, a situation may arise in which a strong echo from the nearby reference object conceals a weaker echo from a person, so that the maximum distance in which a person can be reliably detected is less than what the sensitivity of the transceiver would allow for. An actuator might be provided for moving the reference object into and out of the propagation path of the radar beam, but such an actuator and the means for controlling it increase the cost of a robot system, and if the actuator doesn't operate properly, and the radar echo is evaluated based on a wrong assumption of where the reference object is, the risk of not detecting a person in good time is high.

SUMMARY

In an embodiment, the present invention provides a radar sensor, comprising: a transceiver unit configured to emit a radar beam at least two different wavelengths along a beam path in an outgoing direction and to receive radar radiation along the beam path in an incoming direction; and a reference object placed in the beam path configured to redirect part of the outgoing radar beam in the incoming direction, wherein the reference object comprises two identical grids, each grid comprising regularly spaced elements arranged at a distance d from each other in a first direction perpendicular to the beam path, the grids being spaced from one another along the beam path by a distance L, and wherein the transceiver unit is operable at a wavelength λ which satisfies $$L = n\frac{2d^2}{\lambda}$$

n being an integer.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
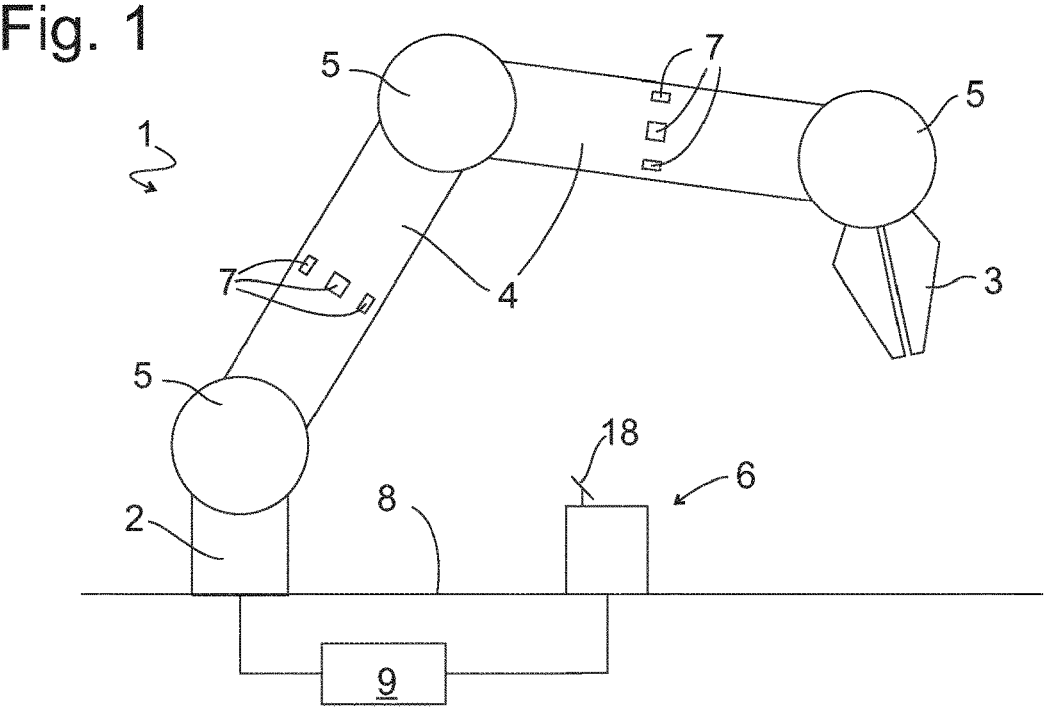
FIG. 1 is a schematic view of a robot system in which the environment of the robot is monitored by radar sensors.

In an embodiment, the present invention provides a radar sensor the correct operation of which can be established with higher reliability.

This object is achieved by a radar sensor comprising a transceiver unit which is operable to emit a radar beam at at least two different wavelengths along a beam path in an outgoing direction and receiving radar radiation along said beam path in an incoming direction, and a reference object placed in said beam path for redirecting part of the emitted radar beam towards the transceiver, wherein the reference object comprises two identical grids, each grid being formed of regularly spaced objects arranged at a distanced from each other in a first direction perpendicular to the beam path, the grids being spaced from one another along the beam path by a distance L, and in that the transceiver unit (10) is operable at a wavelength λ which satisfies $$L = n\frac{2d^2}{\lambda}$$

n being an integer.

The invention makes use of the so-called Talbot effect: when monochromatic radiation is incident on a grating having a grating constant d, an intensity distribution of the radiation behind the grating will result in which in a plane (referred to subsequently as the Talbot plane) at a distance L 2 d/$\lambda^2$ from the grating, zeros of intensity will appear at a distance d from each other. Therefore, a second grating whose elements are placed at these intensity zeroes will not reflect an echo back to the transceiver, unless the wavelength of the transceiver is changed.

Since the zeroes of the Talbot plane are offset transversally half the grating period d, one of the grids should be offset with respect to the other in the direction of the period length d. Ideally, if n=1, the offset should be d/2. The same offset would be appropriate for any uneven n, however, the larger n is and the greater the distance between the grids, the more the intensity distribution tends to get blurred, which is why n=1 is preferred.

On the other hand, if n is even, preferably n=2, the two grids may not be offset with respect to each other at all.

In order to keep the intensity of the echo from the rids low in spite of their proximity to the transceiver, the size of the elements that form the grid should be smaller than the wavelength of the radar beam in at least one dimension.

When the size of a reference element is smaller than the radar wavelength, its radar cross section is proportional to the fourth power of the size; therefore the power of the echo of the reference elements can be adjusted to be smaller than that of the echo of a person, so that if the transceiver is sensitive enough to detect the echo of the reference elements, any person will be detected a fortiori.

The size in said first dimension of the object elements that make up the grids may be smaller than half the wavelength, preferably smaller than a fifth of the wavelength, and still more preferably, smaller than a tenth of the wavelength of the radar beam.

At least one of the grids should be located beyond a leakage range of the transceiver unit, in order to be detectable.

The other grid, however, can be located within the leakage range, in order not to be detectable.

Since by changing the wavelength of the radar beam, the Talbot plane of the first grid can be displaced with respect to the second grid, it is possible to switch between states having different intensities of echoes from the grids, even if both grids are stationary mounted with respect to the transceiver.

In a second dimension orthogonal to said first dimension the size of the at least one reference element can be larger than the wavelength of the radar beam. This facilitates mounting of the reference elements, in particular if at least one end of the elongate reference objects extends beyond the cross section of the radar beam.

Typically, the reference elements can be metallic wires.

Manufacture of the radar sensor is facilitated if each reference element is linear having first and second ends, and if the first and second ends of the reference elements are mounted in a frame.

In the simplest case, the transceiver operates at one wavelength at a time, i.e. it switches from one wavelength to the other. In that case it can be taken for granted that if an echo from the grids is detected while the transceiver is operating at a first wavelength, it will also be operating at a second wavelength, although at that second wavelength an echo from the grids may not be detectable due to the elements of the second grid being located at intensity zeroes of the Talbot grid generated by the first grid.

Specifically, such a transceiver may be of the FMCW (frequency modulated continuous wave) type.

It would also be conceivable to have a transceiver capable of operating at both wavelengths simultaneously, so that at a same time one of the wavelengths might yield an echo, whereas the other doesn't. In that case, the echo might be monitored continuously, and any defect would be safely detected, provided it affects both wavelengths.

The radar sensor may be mounted on a robot arm, in order to detect persons in the vicinity of the robot and to control movements of the robot based on this detection so as to avoid collisions between the robot and a person.

FIG. 1 is a schematic view of a manufacturing robot 1 comprising a stationary base 2, an end effector 3 and a plurality of elongate links 4 that are pivotably connected to one another, to the base 2 and the end effector 3 by joints 5. The environment of the robot 1 is monitored for the presence of persons by radar sensors 6, 7. The radar sensor 6 is stationary and may be mounted on a workshop floor 8 in the vicinity of the robot base 2. The radar sensors 7 are installed in the links 4.

A controller 9 is connected to the radar sensors 6, 7 and is programmed to slow down or possibly stop the robot 1 if the distance between the robot 1 and a person drops below a predetermined threshold.

Figure 2:
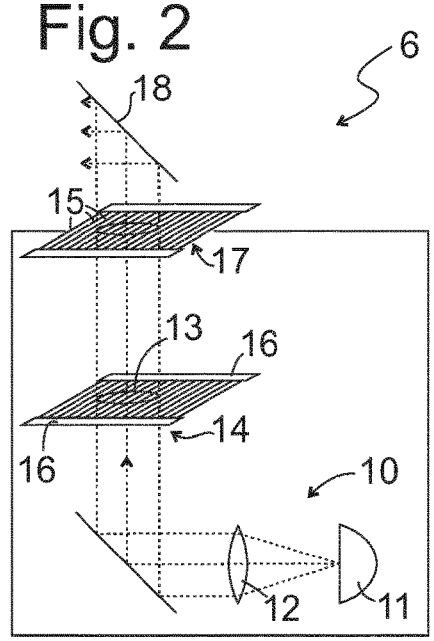
FIG. 2 is a schematic cross section of one of the radar sensors of FIG. 1.

A schematic cross section of the stationary radar sensor 6 is shown in FIG. 2. A transceiver 10 is provided for transmitting and receiving radar signals. If necessary, a lens 12 may be provided for shaping, in particular collimating, the radar waves emanating from antenna 11 into a beam 13, and for focusing a reflected radar echo onto the transceiver 10.

A receiving channel of transceiver 10 is inherently sensitive to the radar wave emitted by a transmitting channel thereof. At the transceiver 10 the intensity of the radar wave being emitted is larger by several orders of magnitude than any radar echo reflected off some object in the vicinity of the radar sensor 6. Therefore, in case of the transceiver emitting radar pulses at a single frequency, the transceiver 10 is sensitive to an echo only while it is not transmitting an impulse that might "leak" into the receiving channel. Alternatively, the transceiver 10 can be of the FMCW (frequency modulated continuous wave) type, i.e. it emits a continuous radar wave the frequency of which is continuously ramped, so that a frequency difference between the transmitted wave and the echo received at the same time is representative of the distance between the transceiver and the object from which the echo originates. In that case, the frequency difference between the outgoing wave and the received echo must exceed a certain threshold in order for the echo to be detectable. In either case, the transceiver 10 is surrounded by a so-called leakage range in which objects cannot be detected because their echo is made undetectable by the outgoing wave.

Within this leakage range, the radar beam 13 passes through a grid 14 formed of thin metallic wires 15 arranged parallel to each other in a regular pattern extending in a plane perpendicular to the propagation direction of beam 13. The width of the beam 13 is sufficient to irradiate a plurality of said wires 15. The length of the wires 15 should preferably be greater than the diameter of the beam 13, so that ends of the wires 15 can be mounted on a frame 16 that doesn't block the beam 13.

The diameter of the wires 15 is smaller than the wavelength of the radar beam 13; e.g. in case of the radar beam having a mean frequency $f_1$ of 100 GHz, corresponding to a wavelength $\lambda_1$ of 3 mm, the diameter of the wires is less than 3 mm, preferably less than 0.6 mm, and still more preferably, less than 0.3 mm, so that the wires do not cast a shadow at the downstream side of the grid 14 and do not reflect the radar beam 13, but merely scatter it.

Since the grid 14 is located within the leakage range, radar waves that scattered back from it to the transceiver 10 are not detected.

A second grid 17 having the same structure as grid 14 is provided in the path of beam 13 outside the leakage range. The two grids 14, 17 extend in parallel planes. The wires 15 of the two grids 14, 17 are aligned with each other, i.e. when seen in the propagation direction of beam 13, the wires 15 of one grid are located at equal distances from both adjacent wires of the other grid. The distance L between the two grids 14, 17 equals $d_1^2/2\lambda_1$, so that if the wavelength of the radar beam is $\lambda_1$, the first grid 14, by Talbot effect, gives rise to an intensity distribution of the radar wave in the plane of the grid 17 which has the form of a line grid whose intensity minima coincide with the wires of the grid 17. Therefore, when the transceiver 10 operates at the wavelength $\lambda_1$, or is ramped in a small interval around $\lambda_1$, the second grid 17 has no effect on the propagation of the radar beam 13.

It has an effect, however, when the wavelength emitted by transceiver 10 is sufficiently different from $\lambda_1$ for the wires 15 of grid 17 to be exposed to a substantial amount of radar radiation. In that case the grid 17 contributes to the radar echo received at transceiver 10, and since the grid 17 is outside the leakage range, this contribution is detected.

For this reason, in the embodiment contemplated here, the transceiver 10 is adapted to switch between two frequency ranges for ramping the frequency of the radar wave, the first one being centered around $f_1=c/\lambda_1$, the other around a different frequency $f_2$. When the radar sensor 6 of this embodiment starts to operate, the transceiver 10 first emits in the frequency range around $f_2$, and a radar echo from grid 17 is detected by transceiver 10. If the intensity of this echo has an expected non-vanishing intensity, it is concluded that the sensor 6 is functional, and the frequency of the transceiver 10 is switched over to a range around $f_1$. In this way, although the radar beam 13 still passes through the grids 14 and 17 on its way from and to the transceiver 10, the grids 14, 17 leave no trace in the radar echo received, and contributions of objects and persons in the vicinity of the robot 1 can be detected with a minimum of background noise.

In practice, the leakage range of radar sensor 6 doesn't have sharp borders, but rather, a transition range where sensitivity gradually increases. The width of the transition range depends on the quality of the transceiver 10 and of the components of the sensor 6 that are located in the path of the radar beam. If this range is wider than $d_1^2/2\lambda_1$, the echo of the second grid 17 will be detected with reduced sensitivity only if grid 14 is placed in the leakage range, or if the echo of the second grid 17 is to be detected with reduced sensitivity, grid 14 must be placed in the transition range. Since the wavefront of the radar beam in the Talbot is similar to that of the first grid, it produces a similar intensity pattern in a "second order Talbot plane" located another $d_1^2/2\lambda_1$ behind the first-mentioned Talbot plane. It readily understood, therefore, that an effect similar to that of grid 17 being placed in the first Talbot plane with its wires offset in a lateral direction with respect to the first grid can be achieved if the second grid 17 is placed at a distance $2\, d_1^2/2\lambda_1$ from grid 14, and if the wires of grid 17 are not offset with respect to those of grid 14.

As shown in FIG. 2, the sensor 2 can have a rotating mirror 18 or similar mobile element for redirecting the beam 13 and thus scanning the surroundings of the sensor 6. The structure of the sensors 7 can be identical to that of the sensor 6, except for the rotating mirror 18, which isn't needed if, as shown in FIG. 1, several sensors 7 are distributed along a circumference of a link 4.

Figure 3:
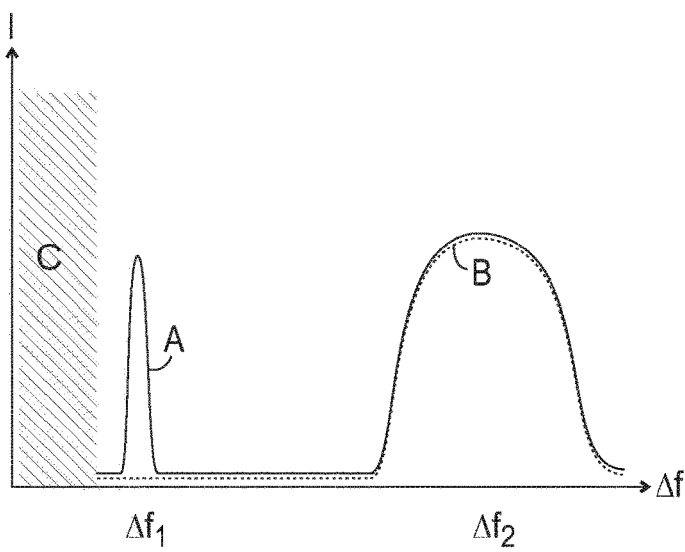
FIG. 3 is an example of a radar echo received by the transceiver of the radar sensor according to a first embodiment.

FIG. 3 gives schematic examples of echo signals detected by transceiver 10. If the frequency of the radar beam 13 is ramped linearly, the frequency difference between outgoing and incoming radar signals is directly representative of the distance between the transceiver 10 and an object which is the source of an echo. Curve A of FIG. 3 is obtained with the sensor operating around $f_2$; at a small frequency difference $\Delta f_1$, just above the leakage range represented by hatched area C, there is the echo from grid 17; at a larger difference $\Delta f_2$, there is an echo from an object, e.g. from the robot 1 itself. When the sensor 6 is operating in the frequency range around $f_1$, the radar beam 13 is unaffected by grid 17, and only the object contributes to the radar echo, but not the grid 17, as shown by curve B.

When a FMCW transceiver is used as the transceiver, its tuning range should comprise the frequency $f_1=c/\lambda_1$ that places grid 17 in the Talbot plane of grid 14. In that case, objects that are struck by the radar beam and reflect an echo to the transceiver 10 contribute continuously to the received echo signal, regardless of its instantaneous frequency, whereas the grid 17 contributes only when the frequency is close to $f_1$. The contributions of the grid 17 and of objects to be detected to the radar echo can therefore easily be separated by frequency filtering; specifically the contribution of the grid can be extracted by multiplying the echo signal with a carrier signal whose period is the same as that of the transceiver frequency ramp.

Figure 4:
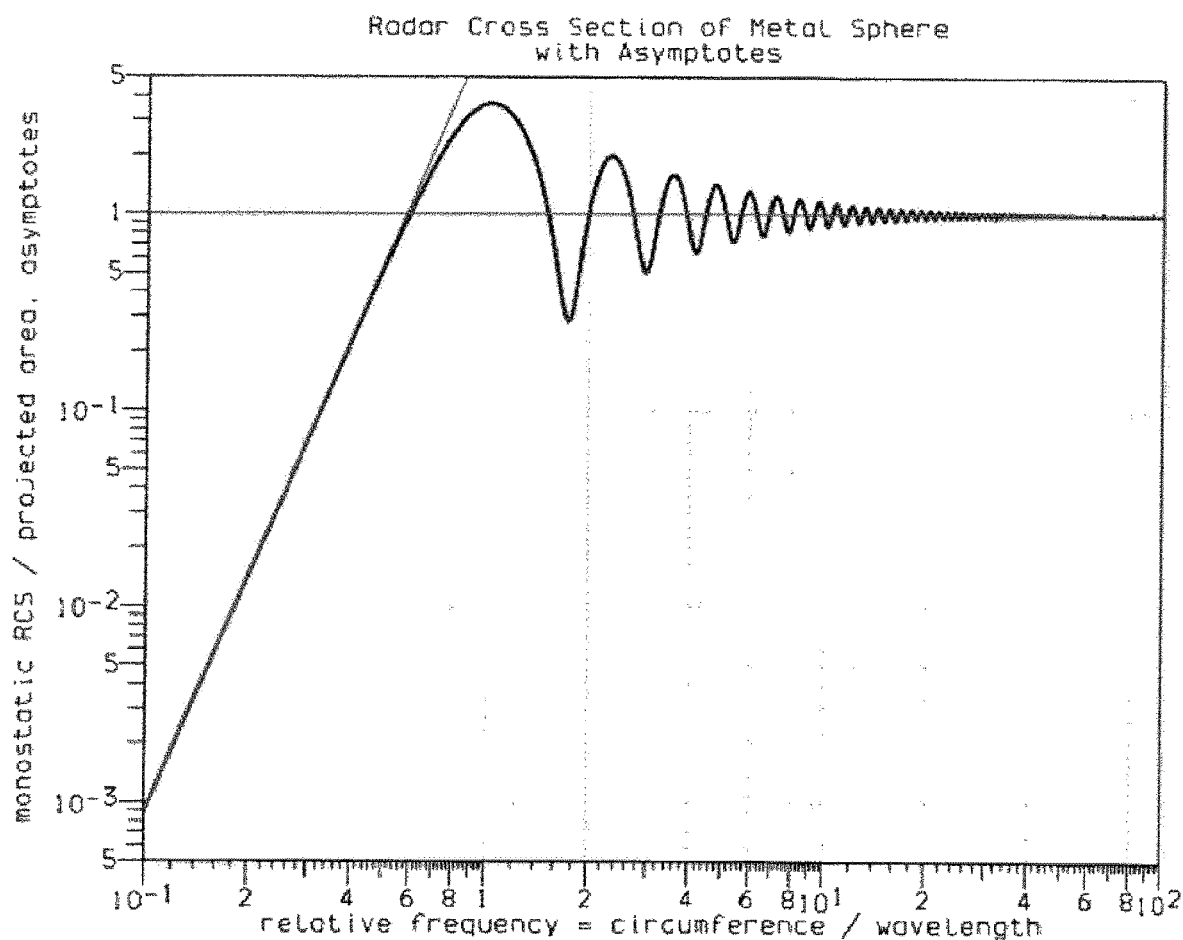
FIG. 4 is a graph illustrating the relative radar cross section of a metallic sphere as a function of relative frequency

Due to the small diameter of the wires 15, the radar echo from grid 17 can be limited to a low value which will not overshadow an echo from an outside object, even if this outside object is close to the grid 17, and by appropriately choosing this diameter, the intensity of the radar echo from grid 17 can be set to any desired value. As shown in the diagram of FIG. 4, when the diameter of a metallic sphere is much larger that the radar wavelength, i.e. at a relative frequency of 10 or above, the ratio between radar cross section and projected area of the sphere converges towards unity. On the other hand, when the diameter is smaller than the wavelength, this ratio is proportional to the fourth power of the frequency. A similar relation holds for the wires 15 of grids 14 and 17. Therefore, the diameter of the wires 15 can be chosen so that although the grid 17 extends across the entire cross section of beam 13, the echo that originates from the grid 17 is only slightly above the detection threshold of transceiver 10.

Figure 5:
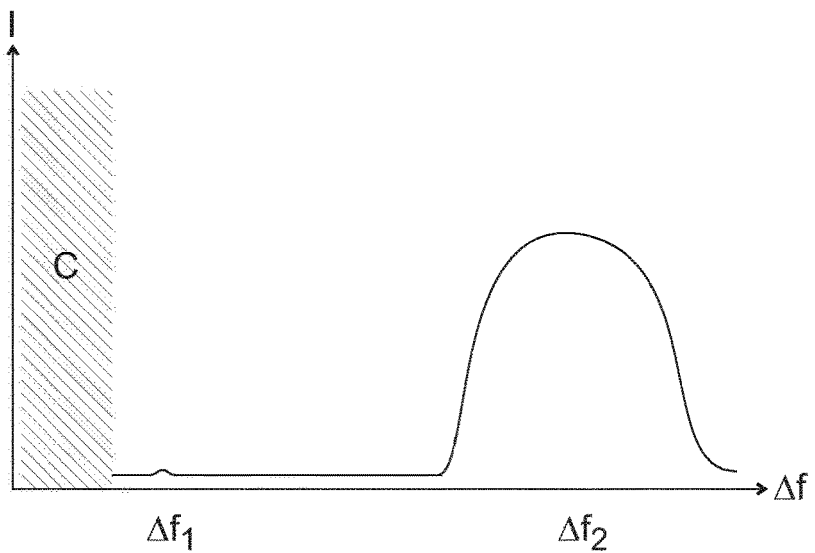
FIG. 5 is an example of a radar echo received by the transceiver of the radar sensor according to a second embodiment.

When the intensity of the echo from grid 17 is set as low as this, the radar sensor 6 can be simplified by dispensing with grid 14. In that case, the echo from the grid 17 is present continuously while the sensor 6 is operating, but this doesn't cause a problem, since this echo is too weak to conceal the echo of an outside object close to the leakage range that should be detected. Quite to the contrary, precisely because the echo from the grid 17 is weak, any malfunction of the sensor 6 is likely to cause it to drop below the detection threshold, whereby the malfunction is detected. An example of a typical radar echo signal according to this simplified embodiment is shown in FIG. 5 in a diagram analogous to that of FIG. 3.

According to this embodiment, the transceiver 10 can also be simplified, since there is no more need to switch between different frequency ranges. Since the echo from grid 17 is present whenever the sensor 6 is operating, and not only if it is operating in the frequency range around $f_2$, a malfunction of sensor 6 is detected as soon as it occurs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 robot
2 base
3 end effector
4 link
5 joint
6 radar sensor
7 radar sensor
8 floor
9 controller
10 transceiver unit
11 antenna
12 lens
13 beam
14 grid
15 wire
16 frame
17 grid
18 mirror

What is claimed is:

1. A radar sensor, comprising:
a transceiver unit configured to emit a radar beam at least two different wavelengths along a beam path in an outgoing direction and to receive radar radiation along the beam path in an incoming direction; and
a reference object placed in the beam path configured to redirect part of the outgoing radar beam in the incoming direction,
wherein the reference object comprises two identical grids, each grid comprising regularly spaced elements arranged at a distance d from each other in a first direction perpendicular to the beam path, the grids being spaced from one another along the beam path by a distance L, and
wherein the transceiver unit is operable at a wavelength λ which satisfies $$L = n\frac{2d^2}{\lambda}$$

n being an integer.

2. The radar sensor of claim 1, wherein one grid is offset with respect to the other grid in a direction of the period length d.

3. The radar sensor of claim 2, wherein n is odd and the offset is d/2.

4. The radar sensor of claim 1, wherein n is even and the grids are not offset.

5. The radar sensor of claim 1, wherein n=1 or n=2.

6. The radar sensor of claim 1, wherein the grids comprise elements, a dimension of which in the first direction is smaller than the wavelength of the radar beam.

7. The radar sensor of claim 1, wherein a size of the elements in the first dimension is smaller than half the wavelength.

8. The radar sensor of claim 1, wherein at least one of the grids is located beyond a leakage range of the transceiver unit.

9. The radar sensor of claim 1, wherein one of the grids is located within a leakage range of the transceiver unit.

10. The radar sensor of claim 1, wherein the grids are stationarily mounted with respect to the transceiver unit.

11. The radar sensor of claim 1, wherein a size of the elements in a second dimension orthogonal to the first dimension is larger than the wavelength of the radar beam.

12. The radar sensor of claim 1, wherein the elements comprise metallic wires.

13. The radar sensor of claim 1, wherein each element is linear and has first and second ends, and
wherein the first and second ends of the reference elements are mounted in a frame.

14. The radar sensor of claim 1, wherein the transceiver unit is operable at two wavelengths in a time-multiplexed way.

15. The radar sensor of claim 1, wherein the transceiver unit comprises a FMCW transceiver unit.

16. The radar sensor of claim 7, wherein the size of the elements in the first dimension is smaller than a fifth of the wavelength.

17. The radar sensor of claim 16, wherein the size of the elements in the first dimension is smaller than a tenth of the wavelength.

18. The radar sensor of claim 11, wherein the size of the elements in the second dimension is larger than a diameter of the radar beam.

19. A robot, comprising:
at least one link which is rotatably connected to a base, an end effector, or another link,
wherein the at least one link comprises at least one radar sensor comprising:
a transceiver unit configured to emit a radar beam at least two different wavelengths along a beam path in an outgoing direction and to receive radar radiation along the beam path in an incoming direction; and a reference object placed in the beam path configured to redirect part of the outgoing radar beam in the incoming direction, wherein the reference object comprises two identical grids, each grid comprising regularly spaced elements arranged at a distance d from each other in a first direction perpendicular to the beam path, the grids being spaced from one another along the beam path by a distance L, and wherein the transceiver unit is operable at a wavelength $\lambda$ which satisfies $$L = n\frac{2d^2}{\lambda}$$

n being an integer.

* * * * *